United States Patent [19]

Jensen

[11] 4,071,900

[45] Jan. 31, 1978

[54] CONTROL DEVICE FOR AN INVERTED RECTIFIER

[75] Inventor: Arne Jensen, Sonderborg, Denmark

[73] Assignee: Danfoss A/S, Nordborg, Denmark

[21] Appl. No.: 746,389

[22] Filed: Dec. 1, 1976

[30] Foreign Application Priority Data

Dec. 3, 1975 Germany .............................. 2554223

[51] Int. Cl.² .......................... G06J 1/00; H02P 5/16
[52] U.S. Cl. .................................... 364/600; 307/234; 307/265; 318/341; 328/58
[58] Field of Search ........................... 235/150.53, 197; 328/28, 29, 31, 32, 34, 36, 58, 111, 112, 140, 146, 185; 307/229, 230, 234, 237, 261, 265, 233 R; 318/341

[56] References Cited

U.S. PATENT DOCUMENTS

| 3,743,911 | 7/1973 | Erler ................................ 318/341 X |
| 3,783,360 | 1/1974 | Bundy ............................. 318/341 X |
| 3,883,756 | 5/1975 | Oragon ................................. 307/265 |
| 3,952,236 | 4/1976 | Hoover ........................... 318/341 X |
| 3,978,424 | 8/1976 | Hobo et al. ........................ 328/34 X |

*Primary Examiner*—Joseph F. Ruggiero

[57] ABSTRACT

The invention relates to a control unit for an inverted rectifier of the type having a constant DC voltage supply and a frequency settable by a frequency control signal. The main feature of the control unit relative to the invention hereof is the monitoring of the critical pulse spacings of the pulse generator output without the use of time-dependent elements. The control unit includes a voltage controlled oscillator for generating a triangular wave form controlled by a frequency control voltage. A variable width pulse generator is fed by the triangular wave form and is controlled by a pulse width control voltage. The control unit includes an analog computer for generating internally thereof a function which corresponds to the spacing of the pulses of the pulse generator. The computer includes an amplifier having a noninverting input for receiving a control signal which corresponds to the amplitude of the triangular wave form. The inverting input of the amplifier receives a combined signal corresponding to the frequency control voltage and the pulse width control voltage. The output of the computer is a digital signal which occurs when a critical predetermined value of the computer generated function is reached.

5 Claims, 3 Drawing Figures

CONTROL DEVICE FOR AN INVERTED RECTIFIER

The invention relates to a device on an inverted rectifier with a constant DC voltage supply and a frequency settable by a first control signal and an amplitude of the fundamental oscillation settable by a second control signal, wherein, for forming width-modulated impulses, a wave train generator delivers a wave train of constant amplitude at a frequency governed by the first control signal and an impulse width signal generator delivers impulse width signals in dependence on the points of intersection between the wave train and the second control signal.

In a known three-phase inverted rectifier which is particularly intended to feed an AC motor, a first control signal is on the one hand fed to a cycle generator of which the cycle signals are fed after division to a zone signal generator which characterises the phase half-waves. The first control signal is also used to produce a triangular wave train which is intersected by the second control signal in an impulse width signal generator, impulse width signals being produced in dependence on the points of intersection. In a logic portion, the zone signals and the impulse width signals are interlinked in such a way that at each output terminal of the inverted rectifier a constant potential is available during the first 60° of each half-wave, width-modulated impulses are available during the second 60°, and a constant potential is again available during the last 60°. The linked voltages consist of impulse trains of which the time integrals are more or less sinusoidal.

With this and other inverted rectifiers, increasing frequency and output voltage presents the problem that the impulse spacings become so small that an adequate commutation period is no longer available. This is particularly so in the case of inverted rectifiers of which the switching elements are thyristors. It is therefore already known to monitor the impulse spacing in that the time between successive impulses is compared with a fixed time interval and, upon reaching this fixed time interval, the impulse frequency is switched to a lower value. However, this requires considerable expenditure because to determine the fixed time interval a time generator must be provided which is set in motion after each impulse and also because a time comparator must be provided. Such time-dependent elements are sensitive and subject to faults.

The invention is based on the problem of providing a device on an inverted rectifier of the aforementioned kind, which device permits the monitoring of the critical impulse spacings without the use of time-dependent elements.

This problem is solved according to the invention in that for monitoring the critical impulse spacings an analogue computer fed by a constant signal and the two control signals is provided to form therefrom a computed value representing a function of the spacing, the computer initiating a switching signal on reaching a predetermined computed value.

This device is based on the recognition of the fact that the points of intersection between the wave train and the second control signal, which determine the impulse width and thus also the impulse spacings, can be expressed as a mathematical function because the wave train can be described by the first control signal which defines its frequency and by the constant signal which characterises its amplitude. Such functional relationships can be processed without difficulty in an analogue computer. Also, only the two control signals and the constant signal need be fed into this analogue computer.

It is not necessary for the analogue computer constantly to calculate the instantaneous impulse spacing. Instead, any desired function may be prescribed provided that on reaching the critical spacing a defined computed value is available with which the switching-over signal can be initiated.

In a preferred embodiment, the analogue computer forms a function which becomes zero on reaching the critical spacing and in which the switching signal is produced by a zero point detector following same. In this way a very accurate characterisation for reaching the critical spacing is possible. The input values and the output value of the analogue computer can be interlinked in the form of an unbalanced equation which, upon reaching the balanced condition, initiates the switching-over signal.

In a preferred embodiment, it is ensured that the signals are voltages, that the wave train is a triangular wave train, and that the analogue computer comprises an amplifier of which the first input is connected to the tapping of a voltage divider fed by the constant voltage and the second input is connected to terminals for both control voltages by way of a respective resistor and connected to the amplifier output by way of a feedback resistor. Since the first control signal is decisive for the frequency of the wave train and the second signal voltage is decisive for the impulse width, a simple comparison of the said values can determine the critical spacing between successive wider impulses. By appropriately dimensioning the said resistors, one ensures that the output voltage of the analogue computer becomes zero at the critical spacing.

Further, by changing the input resistors one can also set the critical spacing at which switching-over is to take place. It is particularly favourable if the resistor between the connection for the constant voltage and the one input of the amplifier and the resistor between the connection for the control voltage governing the amplitude and the other input of the amplifier are adjustable in parallel, e.g. form a tandem potentiometer.

By means of the analogue computer, any desired impulse spacing can be monitored. A 'critical' impulse spacing is therefore every spacing regarded as critical by the user, this including not only the minimum spacing required for maintaining the commutation period but also, for example, a somewhat larger safety spacing.

Apart from triangular voltages for the wave train, trapezoidal voltages, saw-tooth voltages and the like are also feasible, as are all wave forms which can be expressed as a function. The wave train generally has a frequency which is a multiple of the output frequency of the inverted rectifier.

The device is suitable not only for inverted rectifiers in which impulses of a single variable width are provided but also for inverted rectifiers in which impulses of different widths are used. As a rule, the critical impulse spacings are then first to be expected between the wider impulses and the analogue computer should be fed with the second control signal responsible for the wider impulses.

An example of the invention will now be described in more detail with reference to the drawing, in which.

Figure 1:
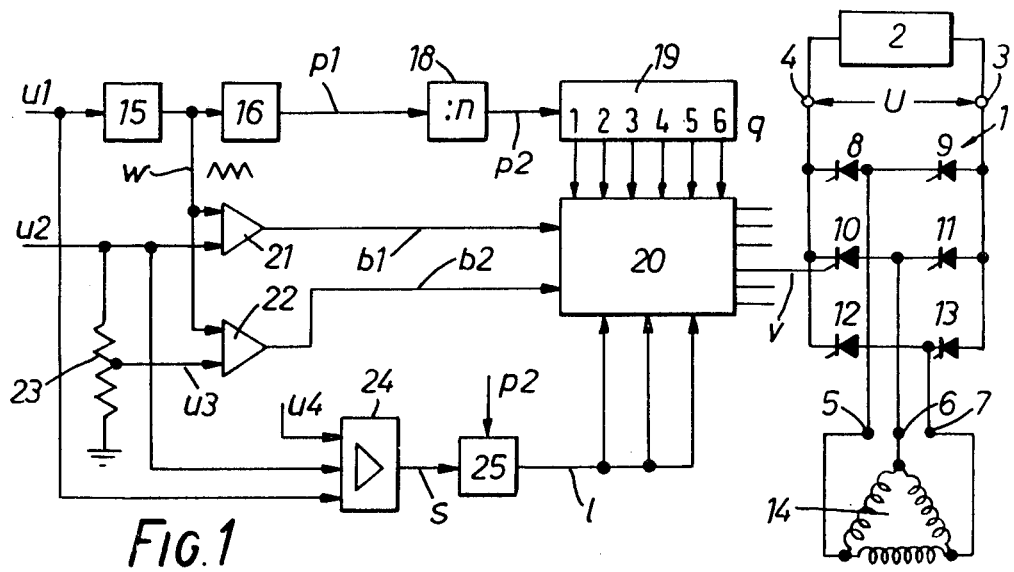
FIG. 1 is a diagrammatic circuit diagram of an inverted rectifier with the device according to the invention.

FIG. 1 first of all shows a conventional inverted rectifier 1 supplied with a voltage U by a constant DC voltage supply 2, so that a positive potential is at the input terminals 3 and a negative potential at the input terminal 4, each of U/2. The DC voltage supply 2 can for example consist of a battery or an AC-fed rectifier arrangement. The output terminals 5, 6 and 7 are each connected between two series-connected controllable rectifiers 8 and 9, 10 and 11 or 12 and 13. Only one rectifier of each pair is conductive. An AC load, in this case a delta-connected asynchronous motor 14, is connected to the output terminals. The frequency of the basic oscillation of the output voltage at the terminals 5 to 7 and thus the rotary speed of the asynchronous motor 14 is variable with the aid of a first control signal $u1$ and the amplitude of the basic oscillation of the output voltage is variable with the aid of a second control signal $u2$. Both control signals can be fed in parallel or even be formed by a common signal.

The first control signal $u1$ is a voltage which influences a voltage-controlled oscillator 15 producing a triangular wave train $w$. The frequency of this wave train of constant amplitude is proportional to the first control signal $u1$. A cycle generator 16 produces cycle impulses $p1$ when determining the peaks. These impulses are divided by $n$ in a divider 18. The resulting cycle impulses $p2$ are fed to a six-stage ring counter 19 which successively produces at its outputs interval signals $q1$ to $q6$ corresponding to each 30° of the inverted rectifier frequency. The interval signals are fed to a logic portion 20.

In addition, the wave train $w$ is fed to two comparators 21 and 22. The comparator 21 is supplied with a first control voltage equal to the first control signal $u2$. At the output, there occurs a first width signal $b1$ for wider impulses when the first control voltage $u2$ is larger than the voltage of the wave train $w$. The second comparator is supplied with a second control voltage $u3$ which is tapped from the tapping of a voltage divider 23 that is supplied with the second control signal $u2$. Second width signals $b2$ occur at its output when the second control voltage $u3$ is larger than the voltage of the wave train $w$. The width signals $b1$ and $b2$ are also fed to the logic portion 20.

An analogue computer 24 is also provided and, apart from the two control signals $u1$ and $u2$, it is fed with a fixed voltage $u4$. This analogue computer delivers a switching-over signal $s$ when the spacing between adjacent wider impulses falls below a critical value. This controls a switching-over apparatus 25 which may, for example, consist of a flip-flop and the output of which delivers a permanent signal 1 to the logic portion 20 upon the occurrence of a cycle impulse, e.g. $p2$. The permanent signal can for example switch the entire inverted rectifier from width-modulated operation to unmodulated operation.

The outputs of the logic portion feed switching control signals $v$ for igniting and extinguishing the controlled rectifiers 8 to 13. These signals can if necessary be adapted to the control electrodes by a converter (not shown). The logic portion can for example have a construction such as described in Applicants' copending application Ser. No. 746,791 filed Dec. 1, 1977, entitled 'Method of controlling a three-phase inverted rectifier and means for performing this method'.

Figure 2:
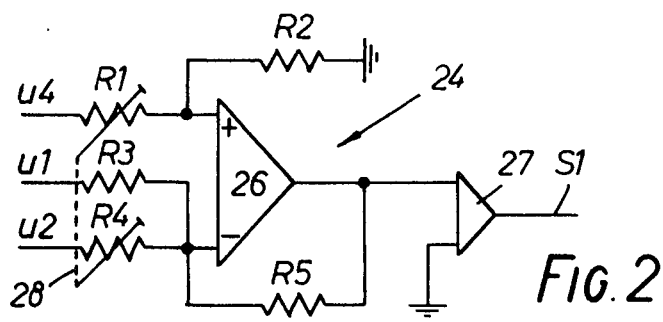
FIG. 2 is the circuit diagram of an analogue computer for monitoring the impulse spacing.

FIG. 2 illustrates the analogue computer 24 of FIG. 1. The non-inverting input of an amplifier 26 is connected to the tapping of a voltage divider which consists of the resistors R1 and R2 and which is fed by the constant voltage $u4$. The inverting input is supplied with the first control signal $u1$ by way of a resistor R3 and the second control signal $u2$ by way of a resistor R4 as well as the output potential by way of a feedback resistor R5. A comparator in the form of a zero point detector 27 determines when the output value is zero and then delivers the switching signal $s1$.

Figure 3:
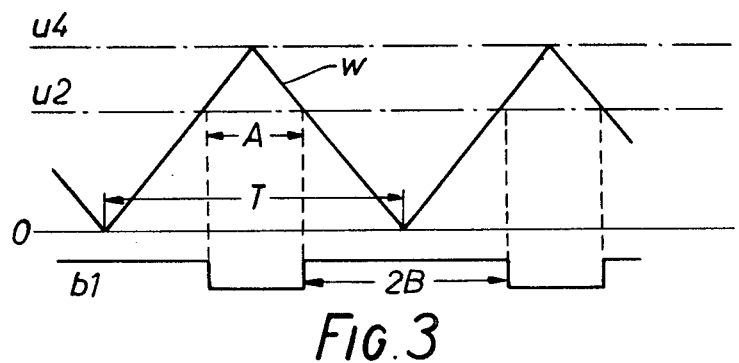
FIG. 3 is a diagram for explaining the function of the analogue computer.

FIG. 3 shows the wave train $w$ with an amplitude of the constant voltage $u4$ and a frequency set by the first control signal $u1$. The width signal $b1$ is shown thereunder. The width 2B is obtained from the points of intersection of the wave train $w$ with the second control signal $u2$. The spacings A between adjacent width signals $b1$ are related to the period T by the ratio $(u4 - u2) : u4$. Since the period T is proportional to $1/u1$, it will be evident that $$A = K(u4 - u2) / (u1 \cdot u4) \tag{1}$$

There is practically no voltage difference between the inputs of the amplifier 26. Consequently, the following applies with a zero output voltage:

$$\frac{u1}{R3} + \frac{u2}{R4} = u4 \frac{R2}{R1+R2}\left(\frac{1}{R3} + \frac{1}{R4} + \frac{1}{R5}\right) \tag{2}$$

In this equation, $u4$ and $u2$ can be given the same coefficient if $$\frac{1}{R4} = \frac{R2}{R1+R2}\left(\frac{1}{R3} + \frac{1}{R4} + \frac{1}{R5}\right) \tag{3}$$

or $$\frac{R4}{R3} = \frac{R1 R5}{R2(R5+R3)} \tag{4}$$

If the right-hand side of (3) is substituted on the right-hand side of (2), one obtains $$\frac{K \cdot R4}{u4 \cdot R3} = \frac{K(u4 - u2)}{u1 \cdot u4} \tag{5}$$

If R3 and R4 are dimensioned so that the critical time is $$A_k = \frac{K \cdot R4}{u4 \cdot R3} \tag{6}$$

the amplifier output will pass through zero at the instant when A reaches the preset time $A_k$. This condition is determined with the aid of the comparator 27 which delivers the switching signal $s$ at its output.

By altering R4, the critical spacing can be adjusted. It is, however, necessary also to alter R1 in proportion thereto because in this way the selected relationship of the equations (3) or (4) will not be disturbed. This simultaneous alteration can be conducted with a tandem potentiometer 28.

The switching signal 1 may also perform a different switching operation, for example it may alter the impulse frequency whilst maintaining the voltage time integral. In other cases it is also sufficient if the switching signal merely switches on a warning signal. If a plurality of critical spacings are monitored in an installation and switching operations are to be performed in relation thereto, a plurality of analogue computers of this kind may also be provided.

I claim:

1. A control device for an inverted rectifier unit having a plurality of switches, comprising a logic unit having a plurality of outputs connected respectively to said rectifier switches, oscillator means having a frequency determined by a first control signal, commutator means between said oscillator and said logic unit for inputting a corresponding plurality of unmodulated zone signals to said logic unit, comparator means connected to said oscillator and controlled by a second control signal for supplying a pulse train to said logic unit having a frequency set by said first signal and spacing determined jointly by said first and second signals, analog computer means for generating a function which corresponds to said pulse train spacing, said computer having a first input for receiving a third signal for adjustably setting a critical spacing corresponding to the amplitude of the output of said oscillator means, said computer having second and third inputs for receiving respectively said first and second control signals for comparison with said third signal.

2. A control device according to claim 1 wherein said computer has output means for generating a digital signal when a critical predetermined value of said computer generated function is reached.

3. A control device according to claim 2, wherein said digital signal is generated when said computer generated function becomes zero.

4. A control device according to claim 1 wherein said three control signals are DC voltages, that said oscillator means generates a triangular wave form, that said computer includes an amplifier having inverting and noninverting inputs, said noninverting input being connected to the tapping of a voltage divider fed by said third control signal, said inverting input being connected through respective resistors to said first and second control signals to the amplifier output through a feedback resistor.

5. A control device according to claim 4 wherein said voltage divider and said second control signal resistor are variable in parallel.

* * * * *